3,361,799
CYCLAMIC ACID FROM DOUBLE SALT,
WATER AND SULFURIC ACID
Vipin D. Shah, Waukegan, and Sheldon Bernsen, Highland Park, Ill., assignors to Abbott Laboratories, Chicago, Ill., a corporation of Illinois
No Drawing. Filed Apr. 27, 1965, Ser. No. 451,310
3 Claims. (Cl. 260—513.6)

The present invention is directed to the manufacture of cyclamic acid; more particularly, it is concerned with a commercially-feasible process for making substantially pure cyclohexylsulfamic acid.

Cyclamic acid is a coined name for cyclohexylsulfamic acid, the acid which is chemically closely-related to cyclamates. Cyclamic acid possesses about the same sweetness as the cyclamates but in addition produces a sensation of tartness. Due to the sweetness and tartness, it creates a specific taste sensation and it is for this reason that it has found its way into the consumer market as an additive in fruit products, beverages, and other foods.

The prior art recognizes two methods of producing cyclamic acid: the conversion of salts of cyclamic acid to the free acid by using ion exchange materials, or, exchanging the cation of a cyclamate salt by the addition of an excess mineral acid with subsequent fractional crystallization. Both of these methods are impractical and uneconomical. In the case of the ion exchange resin, the cost of the latter adds drastically to the process; in the case of converting the salt to the free acid with excess of a mineral acid, the fractional crystallization represents a serious cost factor and, additionally, the cyclamic acid obtained is heavily contaminated with by-products which are extremely difficult to remove. Furthermore, both of these processes use cyclamate salts as the starting material, which is ordinarily prepared from cyclohexylammonium-N-cyclohexyl-sulfamate (hereinafter referred to simply as "double salt") in a process which requires all kinds of subsequent purification and recovery steps.

It is therefore an object of the present invention to provide a simple and inexpensive process for the manufacture of cyclamic acid; it is a further object to provide a process for the manufacture of cyclamic acid of very high purity without the necessity of specific purification methods; it is a further object of the present invention to provide a method of producing cyclamic acid in high yields of substantially pure material; a still further object of the present invention is the provision of an economical process for the direct production of cyclamic acid from "double salt."

These and other objects are accomplished by the process consisting essentially in heating a mixture of 100 parts of "double salt," 300–550 parts of water, and at least 35.3 parts of sulfuric acid (100%), to a temperature between 45° and 65° C. for a period of at least 15 minutes, subsequently cooling the mixture to room temperature or below, recovering the crystallized cyclamic acid, and washing it with 0.5–3.0 parts of water per part of cyclamic acid. By using this process, cyclamic acid is obtained in substantially pure form, i.e. of a purity of at least 98% and containing less than 0.5% of sulfate ions.

While it is possible to make cyclamic acid from "double salt" using solutions of concentrations different from those given above and by using different acids for the conversion, such processes produce cyclamic acid containing much larger amounts of by-products which obviously must be removed in order to result in a cyclamic acid of acceptable quality. The steps required for the removal of unacceptable amounts of by-products are cumbersome, expensive and time-consuming, so that it is of great significance and importance to produce this food additive directly in acceptable quality.

The product crystallizing from the solution may be removed therefrom by filtration, centrifugation, or decantation, and the wash with water can be carried out in any of the well-known ways of the art. It will thus be apparent that the new process is highly economical due to its simplicity, the excellent and unexpected result obtained, and the elimination of one step over older processes.

When in the above process sulfuric acid is used in a large excess, the water wash of the crystalline cyclamic acid is preferably done more thoroughly, since the product contains larger amounts of sulfate ion. It is for this reason that amounts of from 1–3 moles of sulfuric acid per mole of "double salt," or 35.3–105.9 parts per 100 parts, are preferred. Within these limits, only small amounts of sulfate ion need to be washed out of the crystalline product to produce cyclamic acid of a purity approaching 100%. When 35.3–46.0 parts of sulfuric acid are used per 100 parts of "double salt," the crystalline cyclamic acid is frequently found to be of above 98% purity with only a simple water rinse.

It is thus to be observed, in carrying out the process of the present invention, that the ratio of water, "double salt" and sulfuric acid is a critical limitation for making substantially pure cyclamic acid. When more water is used than specified above, large losses of cyclamic acid are encountered and uneconomical amounts of solution must be handled; when an insufficient amount of water is used, the purity of the product suffers because the crystalline cyclamic acid is heavily contaminated with by-products; and when an insufficient amount of sulfuric acid is used in the above reaction, the conversion reaction is incomplete and the purity of cyclamic acid is again unacceptable. The above shown limitations are particularly unexpected in view of the reaction equation $$2C_6H_{11}NH_3 \cdot SO_3NHC_6H_{11} + H_2SO_4 =$$
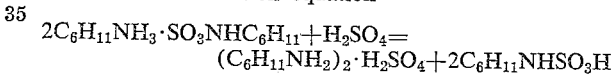
$$(C_6H_{11}NH_2)_2 \cdot H_2SO_4 + 2C_6H_{11}NHSO_3H$$

according to which the new process should require only half of one mole of sulfuric acid per mole of "double salt." When this is translated into parts by weight, it will be found that per 100 parts of "double salt" the theory requires only 17.6 parts of sulfuric acid. It is thus very surprising to find that only the specific minimum excess of sulfuric acid indicated above will produce acceptable yields of substantially pure cyclamic acid.

In a simple embodiment of the process of the present invention, "double salt," water and sulfuric acid are mixed within the above indicated ratios and the mixture is agitated for 1 hour at 45° C. and allowed to crystallize under agitation while cooling to room temperature or below. The crystals are removed from the liquid phase by filtration, washed with 1–3 parts by weight of water per part of cyclamic acid, and dried in known fashion, preferably under vacuum.

In order to demonstrate the process of the present invention more specifically, the following examples are given. They are illustrations only and are not intended to represent the only embodiments of the process.

*Example 1*

To 100 grams of "double salt" dissolved in 131 grams of water, is added 211 grams of 19% sulfuric acid (171 g. $H_2O$; 40 g. $H_2SO_4$). The mixture is agitated at a temperature of 45° for 1 hour, and 5 grams of charcoal is added. After further agitation for 15 minutes, the mixture is filtered at 45° C. The clear filtrate is agitated slowly while it is permitted to cool to 20° C. The filtrate containing crystals of substantially pure cyclamic acid is centrifuged and the obtained crystals are washed with 20 grams of water. Drying the crystals for 4 hours under vacuum at 30° produces cyclamic acid of 99.6% purity containing only 150 p.p.m. of cyclohexylamine and less than 0.3% of sulfate ion.

*Examples 2–12*

The examples indicated in table form below are carried out under the same conditions as described in detail in Example 1. In each instance, 100 grams of "double salt" are treated with water and sulfuric acid in the amounts specified, for a time period as indicated, at a temperature of 45–50° C.

| Ex. No. | Water | $H_2SO_4$ | Time, min. | Cyclamic acid, percent |
|---|---|---|---|---|
| 2 | 300 | 17.6 | 15 | 54.8 |
| 3 | 300 | 35.3 | 15 | 97.7 |
| 4 | 300 | 42.4 | 60 | 99.8 |
| 5 | 300 | 49.4 | 15 | 98.0 |
| 6 | 300 | 86.5 | 15 | 100.2 |
| 7 | 300 | 109.4 | 15 | 100.2 |
| 8 | 100 | 42.4 | 60 | 78.9 |
| 9 | 186 | 42.4 | 60 | 81.2 |
| 10 | 300 | 42.4 | 60 | 99.8 |
| 11 | 400 | 77.7 | 15 | 99.3 |
| 12 | 470 | 42.7 | 60 | 100.2 |

From the above examples it will be apparent that only when specified amounts of water and a specific minimum amount of sulfuric acid are used, an acceptable product is obtained. The amount of water and sulfuric acid indicated does not have to be added to the "double salt" in separate manipulations; the water may be added partially as such and partially together with the sulfuric acid when using a diluted form of the acid, or, the required amount of water may be added initially to make a solution of "double salt," and sulfuric acid is then added in concentrated form. At any rate, the total amount of water in the mixture must fall within the above specified range to produce an acceptable yield of substantially pure cyclamic acid.

While it is usually sufficient to heat the mixture of water, sulfuric acid and "double salt" to 45° C. for a period of at least 15 minutes, it will be obvious that higher temperatures can be employed with equally good results but, ordinarily, an upper limit of 65° C. should be observed because cyclamic acid is somewhat unstable when kept at elevated temperatures for prolonged periods in the presence of the other components of the process solution.

Ordinarily, it is sufficient to heat the mixture for 15 minutes, but with large batches it may require a longer period of time to attain a temperature of 45° or more. In practice, it is sufficient to heat the mixture until a temperature of 45° is reached or until the "double salt" is completely dissolved without heating the mixture for any considerable length of time. Upon cooling the solution to below 25° C., the substantially pure cyclamic acid crystallizes.

The cyclamic acid obtained by the above process is obtained in pure white crystals in satisfactory yield and unexpectedly high quality. It will, however, be apparent that the crystallization liquors contain additional amounts of recoverable cyclamic acid, but since this second crop is not attainable in sufficiently good quality in the usual recovery steps for second-crop material, the filtrate is ordinarily neutralized and combined with solutions from which calcium or sodium cyclamates are prepared. This is a further advantage of the present process since virtually no losses of "double salt" are encountered and again it is seen that a large excess of sulfuric acid may be undesirable due to the large amount of alkali required for neutralization. Proceeding in this manner also makes it possible to recover the cyclohexylamine which splits off from the "double salt" treated according to the present invention.

Others may practice the invention in any of the numerous ways which will be suggested to one skilled in the art by the present disclosure. All such practice of the invention is considered a part hereof provided it falls within the scope of the appended claims.

We claim:
1. The process of making substantially pure cyclohexylsulfamic acid consisting essentially in heating a mixture of 100 parts of cyclohexylammonium-N-cyclohexylsulfamate, 300–550 parts of water and at least 35.3 parts of 100% sulfuric acid to a temperature between 45° and 65° C. for a period of at least 15 minutes, cooling the mixture to a temperature below 25° C., recovering the formed crystals of cyclohexylsulfamic acid, and washing said crystals with 0.5–3.0 parts of water.
2. The process of claim 1 wherein the amount of sulfuric acid is between 35.3 and 110 parts.
3. The process of claim 1 wherein the amount of sulfuric acid is between 1 mole and 1.5 moles per mole of cyclohexylammonium-N-cyclohexylsulfamate.

References Cited

UNITED STATES PATENTS 2,275,125   3/1942   Audrieth et al. _____ 260—500

LEON ZITVER, *Primary Examiner.*

J. E. EVANS, *Assistant Examiner.*